United States Patent
Ignagni

(12) 
(10) Patent No.: US 6,431,504 B1
(45) Date of Patent: Aug. 13, 2002

(54) ATTACHABLE CONTOURED COMPUTER MOUSE REST

(76) Inventor: Chad Ignagni, 1697 Autumn Breeze La., Lewisville, TX (US) 75077

( * ) Notice: Subject to any disclaimer, the term of this patent is extended or adjusted under 35 U.S.C. 154(b) by 0 days.

(21) Appl. No.: 09/895,632

(22) Filed: Jul. 2, 2001

(51) Int. Cl.[7] ............................................. B43L 15/00
(52) U.S. Cl. ................ 248/118.5; 248/118; 248/118.1; 248/118.3; 248/918; 248/205.3; 400/715; 345/163
(58) Field of Search ........................ 248/118.5, 205.3, 248/683, 118.1, 918, 118, 118.3, 690; 400/715; 345/163

(56) References Cited

U.S. PATENT DOCUMENTS

| | | | |
|---|---|---|---|
| 5,340,067 A | * | 8/1994 | Martin et al. ............ 248/118.5 |
| 5,581,277 A | | 12/1996 | Tajiri |
| 5,762,302 A | | 6/1998 | Myers |
| 5,788,195 A | * | 8/1998 | Rice .......................... 248/118.5 |
| 5,805,143 A | * | 9/1998 | Myers ......................... 345/163 |
| D402,280 S | | 12/1998 | Goodman |
| 5,865,404 A | | 2/1999 | Hesley |
| 5,913,497 A | | 6/1999 | Myers |
| D412,898 S | | 8/1999 | Adams |
| D414,167 S | | 9/1999 | Goodman |
| 5,949,406 A | | 9/1999 | Kress |
| 5,990,870 A | | 11/1999 | Chen et al. |
| D417,660 S | * | 12/1999 | Gooman ..................... D14/114 |
| D419,540 S | | 1/2000 | Salzman |
| 6,016,138 A | * | 1/2000 | Harskamp et al. .......... 345/163 |
| 6,031,523 A | | 2/2000 | Bunke et al. |
| 6,157,370 A | | 12/2000 | Kravtin et al. |
| 6,193,196 B1 | * | 2/2001 | Hesley ..................... 248/118.1 |

FOREIGN PATENT DOCUMENTS

| | | | | |
|---|---|---|---|---|
| JP | 02000112653 A | * | 4/2000 | ................. 345/163 |

* cited by examiner

Primary Examiner—Kimberly T. Wood
(74) Attorney, Agent, or Firm—Randal D. Homburg

(57) ABSTRACT

The invention is a device for an adhesive attachment to an upper or side surface of a computer mouse providing a contoured extension platform for the user to rest his hand and non-operating fingers upon for comfort while using the device with the user's operational fingers.

3 Claims, 2 Drawing Sheets

ATTACHABLE CONTOURED COMPUTER MOUSE REST

CROSS REFERENCE TO RELATED APPLICATIONS

None

I. BACKGROUND OF THE INVENTION

1. Field of Invention

The invention is a device for an adhesive attachment to an upper surface of a computer mouse providing a contoured extension platform for the user to rest his hand, thumb and non-operating fingers upon for comfort while operation of the computer mouse with the user's operational fingers.

2. Description of Prior Art

The following United States patents were discovered and are disclosed within this application for utility patent. All relate to computer mouse accessories and devices for ergonomic improvement of computer operational devices.

Four U.S. Pat. Nos., 6,157,370 to Kravtin, et al., 5,865,404 to Hesley, 5,913,497 to Myers and 5,762,302, also to Myers, are devices providing palm support to a computer mouse, attaching either directly to the rear of the computer mouse or by way of a tether to the rear of a computer mouse, these patents having a roller mechanism on the undersides to roll with the computer mouse, in a sort of trailer fashion. In U.S. Pat. No. D 419,540 to Salzman, a wrist and arm support are disclosed.

Items attaching to the upper surface of a computer mouse include U.S. Pat. Nos. 5,581,277 to Tajiri and 5,949,406 to Kress. The Tajiri patent is a ball mounting to the top of the computer mouse to curve the hand while using the computer mouse, while the Kress patent is a "crown" cradling three fingers of the hand which are the three operational fingers of the hand on a computer mouse. Neither of these provide a resting surface for the entire hand of the user. Detachable and adjustable tabs attaching to the sides of a computer mouse are disclosed in U.S. Pat. No. 5,990,870 to Chen, et al. which provide several embodiments for allowing resting points for the thumb and pinky finger of the users hand during use of the computer mouse.

II. SUMMARY OF THE INVENTION

The primary objective of the invention is to provide an attachable platform to the upper surface of a computer mouse which provides a location for resting a portion of the hand and the non-operational fingers of the users hand for additional comfort to the computer operator during mouse use also providing an expanded area for placement of the thumb and palmar region of the operator's hand. A further objective of the invention is to provide the device without adding significant additional space requirement to the operating area where the computer mouse is used.

III. DESCRIPTION OF THE DRAWINGS

The following drawings are submitted with this utility patent application.

IV. DESCRIPTION OF THE PREFERRED EMBODIMENT

Figure 1:
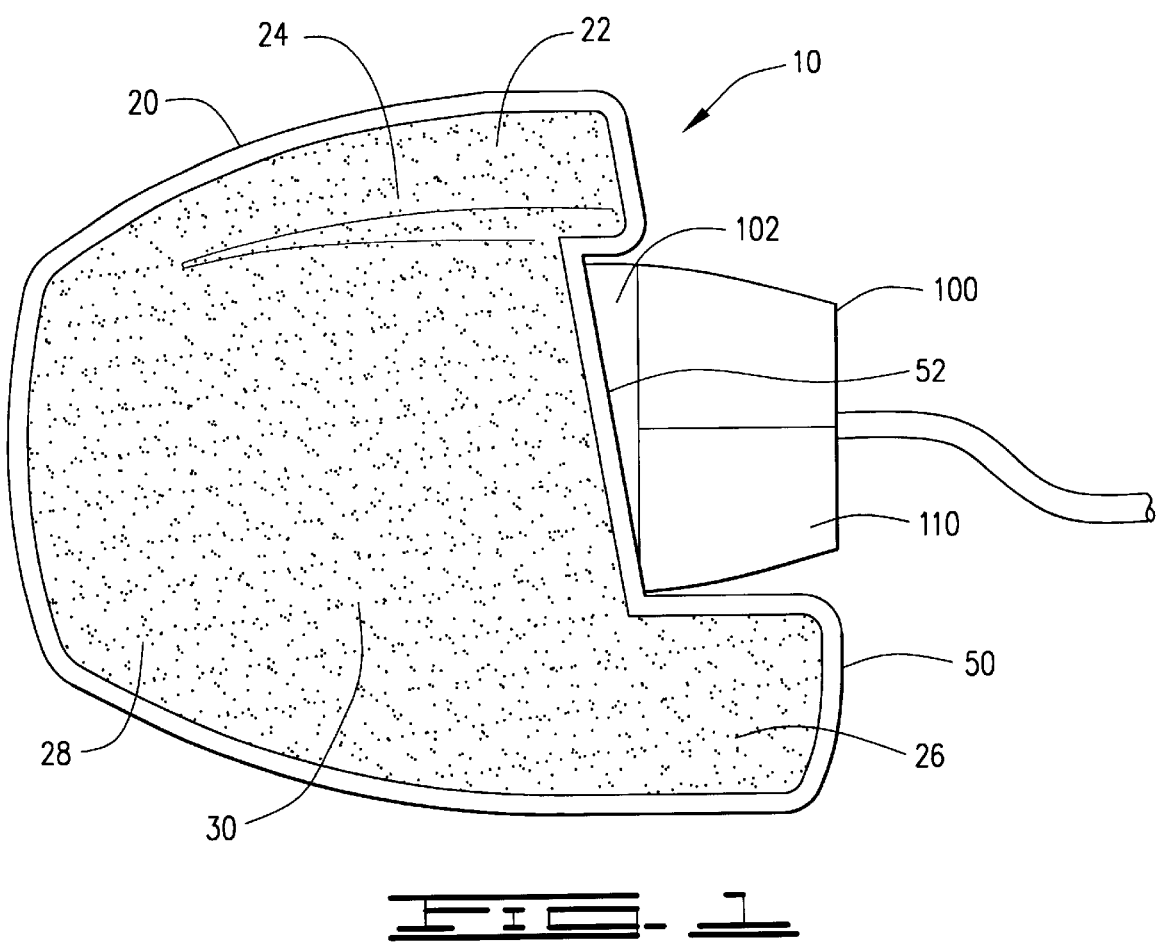
FIG. 1 is a top view of the invention attached to a computer mouse.

The invention, as shown in FIGS. 1–4 of the drawings, is a device 10 adhesively attaching to an 102 upper surface of a computer mouse 100, the device having an upper surface 20, a lower surface 40, a front edge 50, a rear edge 60, a thumb side edge 70, a pinky side edge 80 and an adhesive material 90 secured to the lower surface 40 of the device to affix the device to the upper surface 102 of the computer mouse 100.

The upper surface 20, as shown in FIG. 1 of the drawings, includes a gel-filled hand rest inlay 30 accommodating a user's hand, generally a thumb, a palm, a ring finger and a pinky finger of the operating hand. The upper surface 20 has a slight curve corresponding to a resting position of a human hand, and includes a thumb support 22 having slight depression 24, a non-operational finger support 26 and a palm support 28. The gel-filled hand rest inlay 30 conforms to the upper surface 20, the thumb support 22, the non-operational finger support 26 and the palm support 28 and includes an upper covering 32 made of a friction enhancing material to enhance the traction between the user's hand and the gel-filled hand rest inlay 30. Embodiments are provided for a right handed user and a left handed user.

Figure 2:
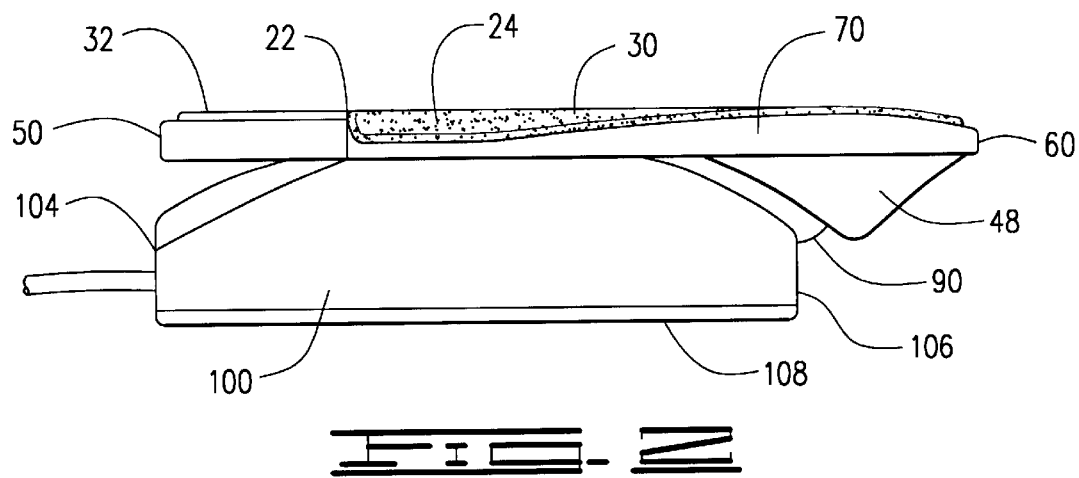
FIG. 2 is a thumb-side view of the invention attached to a computer mouse.
Figure 3:
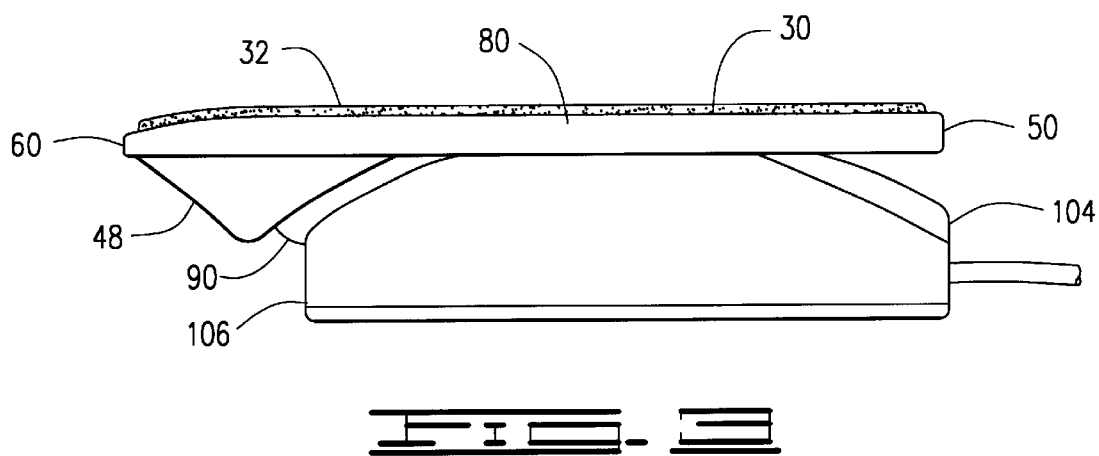
FIG. 3 is a pinky-side view of the invention attached to a computer mouse.
Figure 4:
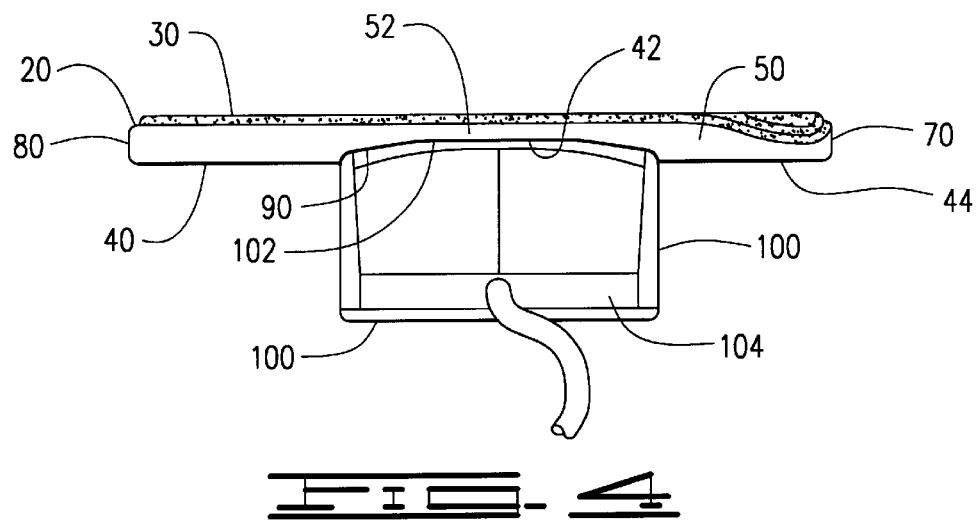
FIG. 4 is a front view of the invention attached to a computer mouse.

The lower surface 40 of the device, as shown in FIG. 4 of the drawings, has a central curvature 42 which conforms to the shape of the upper surface 102 of the computer mouse 100 to which the device is attached. The lower surface 40 includes a thumb side portion 44 and a pinky-side portion 46, wherein said thumb side portion and pinky side portion of the lower surface are above a lower surface 108 of the computer mouse 100, thus not interfering with the operation of the computer mouse. Also extending from the lower surface 40 of the device is a rear wedge support 48 to stabilize the attachment of the device to the upper surface 102 of the computer mouse 100 from the front edge 50 to the rear edge 60 of the device, as shown in FIGS. 2 and 3 of the drawings.

The adhesive material 90 is preferably a single use adhesive to attach the lower surface 40 of the device to the computer mouse 100, including the rear wedge support 48, although it is contemplated that the adhesive material 90 could be of a reusable and removable material. The adhesive material 90 should preferably include a slightly deformable cushioning character to allow for a more secure attachment of the device to the upper surface 102 of the computer mouse in the event that the upper surface 102 of the computer mouse is irregular, non-standard or an uncommon shape.

The front edge 50 of the device extends no further than a front surface 104 of the computer mouse 100. The front edge 50 has a contoured cutout portion 52 to allow for two operational fingers of the user's hand, most preferably an index and a middle finger, to extend beyond the front edge 50 to enable contact with click buttons 110 on the computer mouse 100. One stated objective of the invention is to minimize the requirement of additional space to operate the computer mouse. By extending this front edge 50 no further than the front surface 104 of the computer mouse, no more area is required to operate the computer mouse 100 in a forward direction.

The rear edge 60 of the device, most preferably, terminates slightly beyond a rear surface 106 of the computer mouse, the rear edge 60 extending slightly further than the rear surface 106 of the computer mouse. Once again, this is to comply with the objective of the invention in not increasing the surface area required to operate the computer mouse 100.

The thumb side edge 70 and the pinky side edge 80, shown respectively in FIGS. 2 and 3 of the drawings, are curved to conform to the shape of the user's hand and extend no further than the hand resting upon the upper surface 20, once again to meet the objective of minimizing the additional space requirements to use the computer mouse with the attached device.

While the invention has been particularly shown and described with reference to a preferred embodiment thereof, it will be understood by those skilled in the art that changes in form and detail may be made therein without departing from the spirit and scope of the invention.

What is claimed is:

1. A device adhesively attaching to an upper surface of a computer mouse, the device comprising:
   a. an upper surface having a slight curve corresponding to a resting position of a human hand, and includes a thumb support having slight depression, a non-operational finger support and a palm support, the upper surface also having a gel-filled hand rest inlay accommodating a thumb, a palm, a ring finger and a pinky finger of the user's hand, such gel-filled hand rest inlay conforming to the upper surface, the thumb support, the non-operational finger support and the palm support, such gel-filled hand rest inlay including an upper covering made of a friction enhancing material to enhance the traction between the user's hand and the gel-filled hand rest;
   b. a lower surface having a central curvature conforming to the shape of the upper surface of the computer mouse to which the device is attached, such lower surface including a thumb side portion and a pinky-side portion, wherein said thumb side portion and pinky side portion of the lower surface are above a lower surface of the computer mouse, thus not interfering with the operation of the computer mouse;
   c. a rear wedge support extending from the lower surface of the device stabilizing the attachment of the device to the upper surface of the computer mouse;
   d. a front edge extending no further than a front surface of the computer mouse, such front edge having a contoured cutout portion to allow for two operational fingers of the user's hand to extend beyond the front edge accessing contact with click buttons on the computer mouse;
   e. a thumb side edge curved to conform to the shape of the user's hand and extend no further than the hand resting upon the upper surface;
   f. a rear edge terminating slightly beyond a rear surface of the computer mouse, the rear edge extending slightly further than a rear surface of the computer mouse
   g. a pinky side edge also curved to conform to the shape of the user's hand and extend no further than the hand resting upon the upper surface; and
   h. an adhesive material secured to the lower surface of the device to affix the device to the upper surface of the computer mouse, the adhesive material attaching the lower surface of the device to the computer mouse.

2. The invention, as disclosed in claim 1, wherein the adhesive material is a reusable and removable material having a slightly deformable cushioning character to allow for a secure attachment of the device to the upper surface of the computer mouse in the event that the upper surface of the computer mouse is irregular, non-standard or an uncommon shape.

3. The invention, as disclosed in claim 1, wherein the device is provided for a right handed user and a left handed user.

\* \* \* \* \*